July 7, 1942.  W. L. SCHULTZ  2,289,214
TOP PAN MEMBER FOR MINNOW BUCKETS
Filed Sept. 20, 1940
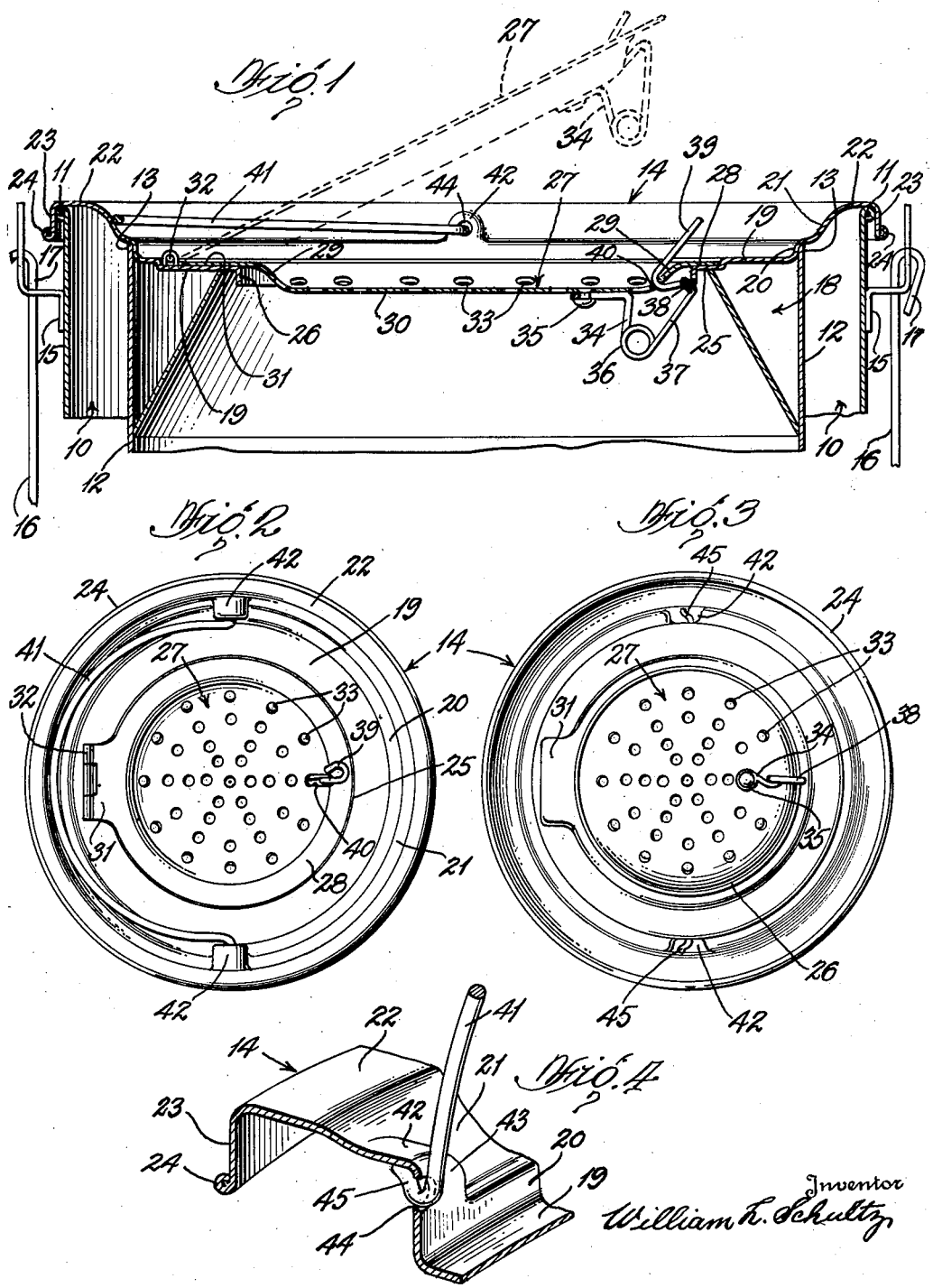

UNITED STATES PATENT OFFICE 2,289,214

TOP PAN MEMBER FOR MINNOW BUCKETS

William L. Schultz, New Albany, Ind., assignor to Stratton & Terstegge Company, Louisville, Ky., a corporation of Kentucky Application September 20, 1940, Serial No. 357,658

3 Claims. (Cl. 43—56)

The invention relates to top pans or end closures for minnow buckets, and has for its objects to provide certain new and useful improvements in devices of this character.

Top pan members of the character described are designed to be permanently secured to the usual cylindrical inner pail member or insert of a minnow bucket assembly, said inner pail member having a perforated or foraminous wall portion to permit access of water thereinto from the outer imperforate pail or bucket member. The said inner pail member having the improved top pan member secured thereto, is adapted for insertion within and convenient removal from said outer imperforate pail member containing a sufficient volume of water to sustain life in and preserve the minnows housed within said inner perforated bucket insert. For this purpose the inner pail member is usually supported by the engagement of the outer periphery of the top pan member of the insert with the open end of the outer bucket, and is suspended thereby with a slight clearance between the bottom of the inner pail and the adjacent bottom of the outer imperforate bucket member. In order to assemble and support the buckets, it is quite customary and usual for the fisherman to disregard the conventional bail or handle thereon, and grasp the top pan member at opposed peripheral portions and handle the same with its inner pail member relative to the outer bucket. Top pan members of known construction are manufactured with the depending outer peripheral flange terminating in a raw edge which has a tendency to lacerate or occasion discomfort to the fingers when grasped for dismantling or assembly purposes as described in respect to the outer bucket member.

An important object of the present improvement is the elimination of such raw edge in the top pan member by providing the outer depending flange of the same with a peripheral terminal bead or curl, preferably outwardly turned so as to afford a convenient and comfortable engagement with the fingers when handling the inner bucket member or insert.

A further object of the improvements is to provide a top pan member or permanent closure for the inner pail member of a minnow bucket assembly wherein the usual wire or other separately attached bail ears are eliminated. Diametrically opposed wall portions of the pan are pressed inwardly in the form of reenforced protuberances, bosses or lugs, which in turn are suitably apertured for the reception therein of the opposite hooked terminal portions of a wire bail or handle for transporting or handling the bucket insert independently of the outer bucket, as for example when the perforated insert with its supply of minnows is submerged in a stream at a desired fishing locality. The described construction obviates the present necessity for attaching separate bail ears as by solder or the like to diametrically opposed portions of the top pan member.

A still further object of the improvements is to provide a spring catch member or latch for the usual hinged and perforated cover of the top pan member, which while manually released to hinge the cover outwardly to obtain access to the minnows within the bucket insert, does not require the operator to engage or touch the catch when closing the cover. In other words, the spring catch or latch member is designed to snap into locking position by mere pressure on the hinged cover in closing the same. In prior minnow buckets it is usually necessary to engage such corresponding spring catch member with the fingers to release the same from the adjacent top pan ledge or suitably disposed keeper, in order to open as well as to close the hinged cover of the top pan member.

With such objects in view as well as other advantages which may be incident to the use of the improvements, the invention consists in the parts and combinations thereof hereinafter set forth and claimed with the understanding that the several necessary elements constituting the same may be varied in proportions and arrangement without departing from the nature and scope of the invention as defined in the appended claims.

In order to make the invention more clearly understood there are shown in the accompanying drawing means for carrying the same into practical effect, without limiting the improvements in their useful application to the particular constructions and arrangements which, for the purpose of explanation, have been made the subject of illustration.

In said drawing:

Fig. 1 is a view in vertical section of the top portion of a minnow bucket assembly, including outer and inner bucket members, and having the instant top pan member of improved construction and design secured to the latter.

Fig. 2 is a top plan view of the top pan member or elements of the inner bucket insert member, drawn on a reduced scale.

Fig. 3 is a bottom plan view of the same.

Fig. 4 is an enlarged fragmentary perspective view, partially in vertical section, illustrating a portion of one of the improved bail ears formed integrally with a wall portion of the top pan member, and showing the manner of attachment of the wire bail or handle thereto.

Referring to the drawing, the reference character 10 in Fig. 1 indicates the usual cylindrical water containing imperforate outer bucket member having an open upper end terminating in a smoothly rounded bead or curl 11. 12 indicates generally the body wall portion of the inner bucket member or insert having an open upper end which is preferably secured as by soldering, brazing or welding as indicated at 13, to the top pan or permanent closure member 14 of improved construction and design in accordance with the present invention. The outer bucket member 10 is illustrated as provided with the usual diametrically opposed perforated offset or other type of bail ears 15, suitably secured at their lower ends to outer wall portions of the bucket and having the usual wire bail or handle 16 secured at its opposite extremities to said ears, for example by means of terminal hook portions of the bail, indicated at 17 in the drawing.

The inner bucket, pail or insert member 12 may if desired be provided at its upper portion with an annular air space or float chamber indicated at 18, while lower wall portions of the insert, not illustrated in the drawing, are suitably perforated or constructed of foraminous material so as to permit circulation therethrough of water contained within the imperforate outer bucket, for the purpose of sustaining life in the contained minnows. The entire minnow bucket assembly, with the exception of the specific construction of the top pan member of the inner pail or insert, may be of the character disclosed in United States Patent 1,451,925, granted April 17, 1923, to William J. Ruff, for Live bait bucket. Reference to said patent will lend to a clearer understanding of the instant improvements, and further description of the general construction and assembly, apart from the instant improvements, is therefore deemed unnecessary.

As best seen in Fig. 1, the top pan member 14 which is permanently secured to the inner minnow containing pail or bucket member comprises a substantially saucer-shaped circular disk having a depressed or countersunk annular top wall portion 19 merging into an intermediate substantially vertical wall 20, to which the body wall 12 of the bucket is permanently secured, as above described. Said substantially vertical wall portion 20 in turn merges into an upwardly and outwardly inclined wall portion 21, terminating in a substantially flat horizontal outer wall portion 22. The latter in turn merges into a depending outer flange member 23 terminating at its lower end in a smooth outwardly curled bead 24, constituting a convenient hand hold for manipulating the bucket member irrespective of its attached bail, without the annoyance otherwise occasioned by the presence of the usual raw edge at the end of the described flange portion of the top pan member. The smooth outwardly curled bead 24 of the top pan element also enhances and improves the general outward appearance of the assembly, and the presence of the outwardly curled bead 11 at the open upper end of the outer bucket member 10 insures sufficient radial outward spacing of the curl or bead 24 to permit the same to be conveniently grasped by the fingers of the user when it is desired to remove the insert from the outer bucket or replace the same therein.

The annular top wall portion 19 of the top pan member merges into an offset substantially horizontal peripheral wall portion 25 terminating in a depending substantially vertical cylindrical flange 26, which defines the dispensing or access opening of the inner pail member or insert 12, and through which access to the minnows may be conveniently obtained. A disk cover 27 of saucer-like configuration and comprising an outer substantially flat annular wall portion 28, an intermediate inclined wall portion 29 and an inner centrally disposed or countersunk wall portion 30, is provided with a rear extension 31 hingedly secured as at 32 to the flat intermediate wall portion 19 of the top pan member. The outer wall portion 28 of the hinged cover rests against the inner offset wall portion 25 of the pan so as to be substantially flush with the wall portion 19 of the latter. The central countersunk panel or wall portion 30 of the hinged cover 27 is preferably provided with suitably arranged spaced apertures or perforations 33 for desirable dissemination of air therethrough to the minnows housed within the inner bucket member having an otherwise perforated wall portion.

A spring latch member is indicated at 34 and is secured at its inner end as at 35 to the central countersunk panel wall 30 of the cover. Said latch member may be constructed of wire having one or more intermediate loop portions 36 to impart the desired outward spring to an integral outwardly inclined portion 37 thereof which terminates in a shoulder or ledge 38 designed to engage beneath the depending terminal flange 26 of the top pan member defining the dispensing opening of the latter. A tongue extension 39 of said spring latch member is projected through a slot or aperture 40 in the top pan wall, and the normal tendency of the spring latch to expand outwardly serves to maintain its shouldered portion 38 in locking engagement beneath the peripheral terminal flange 26 of the pan thereby securely holding the hinged cover 27 in closed position on the top pan element. Inward pressure on finger extension 39 releases the described engaged parts and permits the cover 27 to be raised and swung outwardly on its hinge 32, as indicated in dotted lines in Fig. 1. The cover is returned to locking position by inward pressure thereon, without necessitating again pressing the spring latch inwardly. Under such conditions the outwardly inclined portion 37 of the latch engages the upper extremity of the depending flange 26 and is cammed inwardly by downward pressure until the latch portion 38 thereof clears the lower extremity of the flange 26, and immediately thereafter springs outwardly therebeneath due to is inherent resilience, to again securely lock the hinged cover in place.

Provision is made for transporting the inner pail or insert member 12 independently of its outer enclosed and supporting bucket member 10, for example when it is desired to preserve the minnows by submerging the inner bucket in the running water of a fishing stream. For this purpose it is desirable to provide the inner bucket with the usual wire bail or handle, indicated at 41. As an economical expedient and to obviate the necessity for providing separate attached bail ears on the top pan element, as is usual in minnow bucket assemblies of the present character, the said bail ears are constructed of integral wall portions of the said pan element. At suitably diametrically opposed portions of the pan element 14, the intermediate wall portion 21 of the latter is locally pressed or struck inwardly so as to constitute reenforced bail engaging bosses or lugs 42. These bosses include an inner substantially vertical wall 43 centrally apertured at 44 for the reception therethrough of the hooked terminal portions or extremities 45 of the wire bail 41. The described construction serves adequately to reenforce the pan for supporting purposes at such diametrically localized portions, as well as obviating the necessity for the provision of separate bail ears present in known minnow bucket assemblies and which require the presence of solder or other securing means to obtain such attachment. Obvious economical advantages are therefore obtained by the present improvements in forming the bail ears of the top pan member as integral die-pressed portions of the latter.

It will be understood that the entire top pan element or member constituting the present improvements consists essentially of two parts, each of which may be conveniently formed by suitable die pressing. The top pan member proper consists of an annulus which may be die-pressed from a single sheet of metal at one operation, including the integrally formed bail ears or bosses, and the integrally formed smooth outer curl 24 for engagement by the fingers without discomfort or inconvenience to the user.

The hinged inner cover member 27 constitutes a second element which may be struck and die pressed at one operation from a sheet of metal, with or without the perforations 33 and thereafter attached to the top pan member annulus by the hinged element indicated at 32.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

What is claimed is:

1. A top pan member designed to be secured to the open end of a minnow bucket, comprising an inner countersunk top wall portion defining an opening and a narrow depending flange terminating in an integral smoothly curled bead, said top wall portion having a cover member for said opening, said top pan member further comprising an upstanding wall portion disposed between said flange and said top wall portion provided with a pair of oppositely disposed integrally formed inwardly pressed upstanding perforated boss members, and a wire bail member pivotally secured at its opposite ends to said perforated boss members for transporting said bucket.

2. A top pan member designed to be secured to the open end of a minnow bucket, comprising an inner countersunk top wall portion defining an opening and an outer depending flange terminating in an integral smoothly curled outwardly turned bead, said top wall portion having a cover member for said opening, said curled bead permitting handling of the minnow bucket without engagement of the fingers with an exposed raw edge of said depending flange, said top pan member further comprising an upstanding wall portion disposed between said flange and said top wall portion provided with a pair of oppositely disposed integral inwardly pressed upstanding perforated boss members, and a wire bail member pivotally secured at its opposite ends to said perforated boss members for transporting said bucket.

3. In a top pan member for minnow buckets including an inner countersunk top wall portion defining an opening, an outer depending flange terminating in an integral smoothly curled bead, and a cover member for said opening hingedly secured to said top wall portion; the improvement comprising a spring latch member secured to the inner surface of said cover member adjacent an aperture therein, said latch member including an upwardly and outwardly inclined cam part normally engaging beneath said top wall portion adjacent said opening to hold said cover in closed position, said part thence extending inwardly beneath said cover and terminating in a finger engaging portion projecting outwardly through said aperture in the cover member, whereby inward pressure on said finger engaging portion releases said cam part from engagement with the top wall portion to permit the cover to be hinged outwardly, and inward pressure on said cover member snaps said latch member into reengagement beneath the top wall portion by a camming action between said outwardly inclined part of the latch member and said top wall portion of the pan member adjacent said opening.

WILLIAM L. SCHULTZ.